(12) United States Patent
Lee

(10) Patent No.: US 11,643,049 B2
(45) Date of Patent: May 9, 2023

(54) ETHERNET-BASED VEHICLE CONTROL SYSTEM AND METHOD

(71) Applicant: GARIN SYSTEM Co., Ltd., Incheon (KR)

(72) Inventor: Yun Sub Lee, Incheon (KR)

(73) Assignee: GARIN SYSTEM CO., LTD., Incheon (KR)

( * ) Notice: Subject to any disclaimer, the term of this patent is extended or adjusted under 35 U.S.C. 154(b) by 14 days.

(21) Appl. No.: 17/231,010

(22) Filed: Apr. 15, 2021

(65) Prior Publication Data
US 2021/0323504 A1 Oct. 21, 2021

(30) Foreign Application Priority Data
Apr. 21, 2020 (KR) .................. 10-2020-0048025

(51) Int. Cl.
| | |
|---|---|
| *B60R 25/24* | (2013.01) |
| *H04W 4/40* | (2018.01) |
| *H04L 67/12* | (2022.01) |
| *G07C 9/00* | (2020.01) |

(52) U.S. Cl.
CPC .......... *B60R 25/24* (2013.01); *G07C 9/00309* (2013.01); *H04L 67/12* (2013.01); *H04W 4/40* (2018.02); *B60R 2325/106* (2013.01); *G07C 2009/00515* (2013.01); *G07C 2009/00539* (2013.01); *G07C 2009/00547* (2013.01); *G07C 2209/63* (2013.01)

(58) Field of Classification Search
None
See application file for complete search history.

(56) References Cited

U.S. PATENT DOCUMENTS

| | | | |
|---|---|---|---|
| 4,039,087 A | 8/1977 | Sandvick, Sr. | |
| 4,098,096 A | 7/1978 | Chard | |
| 5,612,578 A | 3/1997 | Flick | |
| 5,719,551 A | 2/1998 | Flick | |
| 6,011,460 A | 1/2000 | Flick | |
| 6,275,147 B1 | 8/2001 | Flick | |
| 6,346,876 B1 | 2/2002 | Flick | |
| 6,756,885 B1 | 6/2004 | Flick | |
| 9,955,396 B1 * | 4/2018 | Heinz | .................. H04L 67/535 |

FOREIGN PATENT DOCUMENTS

KR 10-2014-0124255 A 10/2014

* cited by examiner

*Primary Examiner* — Carlos Garcia

(57) ABSTRACT

Disclosed is an Ethernet-based vehicle control system and method. The Ethernet-based vehicle control system (method) according to the present invention comprises: a router for connecting a vehicle internal network and a vehicle external network; a vehicle electronic element connected to and communicating with the router; and a third-party module newly mounted on a vehicle to control the vehicle electronic element, wherein the vehicle electronic element includes a Remote Keyless Entry (RKE) module, and the third-party module may piggyback on a signal input into the RKE module by a remote controller through the vehicle external network. According to the present invention, since a third-party module can be freely installed and replaced based on Ethernet, various services related to a vehicle may be realized through a vehicle external network.

7 Claims, 10 Drawing Sheets

ETHERNET-BASED VEHICLE CONTROL SYSTEM AND METHOD

CROSS-REFERENCE TO RELATED APPLICATIONS

This application claims priority to and the benefit of Korean Patent Application No. 10-2020-0048025 filed in the Korean Intellectual Property Office on Apr. 21, 2020, the entire contents of which are incorporated herein by reference.

BACKGROUND OF THE INVENTION

Field of the Invention

The present invention relates to a vehicle control technique. More specifically, the present invention relates to an Ethernet-based vehicle control system and method for controlling a vehicle based on Ethernet.

Background of the Related Art

Bosch Co., a corporation located at Gerlingen-Schillerhöhe, GERMANY, has developed a Controller Area Network (CAN) for constructing an efficient vehicle internal network. The CAN provides an economical and stable network since it can control a plurality of modules with one interface. In addition to the CAN, an extended CAN that increases the data transmission rate by adding an ID has been proposed. CAN communication is performed in a way of processing broadcast information by a corresponding vehicle electronic element while the vehicle electronic element is connected to the CAN bus. For example, when a corresponding ECU broadcasts a door open signal to the CAN bus in response to pressing a door open button of a vehicle remote control key, a door lock module related to the door open signal performs door open operation. However, the other vehicle electronic elements unrelated to the door open signal bypass the door open signal. Meanwhile, the CAN has been developed in a very closed environment due to the specificity of being applied to vehicles, and techniques for integrating the CAN with a vehicle external network are proposed to compensate for this shortcoming.

On the other hand, as the functions of vehicles are advanced, various electronic control units (ECUs) are continuously mounted, and network complexity of vehicles increases. That is, as the vehicles change from mechanical types to electronic types, the number of electronic control units, controllers, sensors, and the like mounted on the vehicles increases. Accordingly, it is difficult to process signals quickly and stably using the communication speed and bandwidth of the CAN. Although FlexRay® automotive network communications protocol, which is mainly used for brake systems and cruise controls, has been proposed to solve this problem, there are problems such as increase in the number of connecting lines and increase in development cost.

Therefore, Ethernet for vehicles is spotlighted as an alternative to the FlexRay®. Ethernet for vehicles presents infinite possibility of connected cars. The Ethernet may transmit and receive a large amount of data and also develop the vehicle infotainment environment greatly. In addition, the Ethernet for vehicles may be regarded as a prerequisite condition for operating an advanced driver assistance system (ADAS) of connected cars, autonomous vehicles or the like.

Meanwhile, genuine electronic control units, controllers, sensors, and the like may be replaced for management of vehicles, or a separate third-party module may be added to support various functions (here, the third-party module means equipment manufactured in accordance with a specification provided by developers other than the companies officially developing hardware or software). When a third-party module is installed based on the CAN, a vehicle may be controlled (for example, remote start) in a way of bypassing the ECU. However, when connected cars, autonomous vehicles or the like are implemented based on the Ethernet, since security functions that block hacking or the like from vehicle external networks will be strengthened through a gateway, operation of the third-party module may be blocked or even disabled.

SUMMARY OF THE INVENTION

Therefore, the present invention has been made in view of the above problems, and it is an object of the present invention to provide an Ethernet-based vehicle control system and method, which can achieve smooth driving of a third-party module through a clone or the like of a Media Access Control (MAC) address in response to addition of the third-party module on the basis of Ethernet.

In addition, an object of the present invention is to provide an Ethernet-based vehicle control system and method for controlling a third-party module that performs functions such as alarm, remote start and the like using an RKE module connected to a router.

To accomplish the above object, according to one aspect of the present invention, there is provided an Ethernet-based vehicle control system comprising: a router for connecting a vehicle internal network and a vehicle external network; a vehicle electronic element connected to and communicating with the router; and a third-party module newly mounted on a vehicle to control the vehicle electronic element, wherein the vehicle electronic element includes a Remote Keyless Entry (RKE) module, and the third-party module may piggyback on a signal input into the RKE module by a remote controller through the vehicle external network.

At this point, the system may further comprise a piggyback controller for performing a requested piggyback control function based on a preset RKE signal generated by the RKE controller, wherein the vehicle electronic element includes at least one vehicle sensor, and at least one RKE actuator for performing an RKE function in response to the RKE signal.

In addition, the vehicle electronic element includes at least one vehicle security sensor of the vehicle, and a piggyback alarm controller for switching between an arming mode and a disarming mode based on preset RKE signals generated by the RKE controller, wherein an alarm may be generated based on the at least one vehicle security sensor when the piggyback alarm controller is in the armed mode.

In addition, the system may further comprise a piggyback remote start controller for activating the engine start circuit based on a predetermined RKE signal generated by the RKE controller and the at least one vehicle sensor, wherein the vehicle includes an engine start circuit, and the vehicle electronic element includes at least one vehicle sensor.

On the other hand, an Ethernet-based vehicle control method of the present invention is preferably performed by an Ethernet-based vehicle device including a router for connecting a vehicle internal network and a vehicle external network; a vehicle electronic element connected to and communicating with the router; and a third-party module newly installed in the vehicle to control the vehicle electronic element, wherein the vehicle electronic component includes a Remote Keyless Entry (RKE) module including an RKE receiver for receiving a signal transmitted from an RKE transmitter and an RKE controller for generating an RKE signal from a signal transferred from the RKE receiver, and at least one RKE actuator for responding to an RKE function in response to the RKE signal. The method comprises the steps of: connecting the third-party module to the router to piggyback on a signal input into the RKE module by a remote controller through the vehicle external network; and performing a requested piggyback control function using a piggyback controller based on a predetermined RKE signal generated by the RKE controller.

At this point, the vehicle further includes at least one vehicle security sensor, and the piggyback controller includes a piggyback alarm controller connected to the at least one vehicle security sensor, and the requested piggyback control function is to switch the piggyback alarm controller between an arming mode capable of generating an alarm and a disarming mode, based on at least one vehicle security sensor.

In addition, the vehicle includes an engine start circuit, and the piggyback controller includes a piggyback remote start controller connected to an engine start circuit, and the requested piggyback control function is to activate the engine start circuit.

DESCRIPTION OF SYMBOLS

Figure 1:
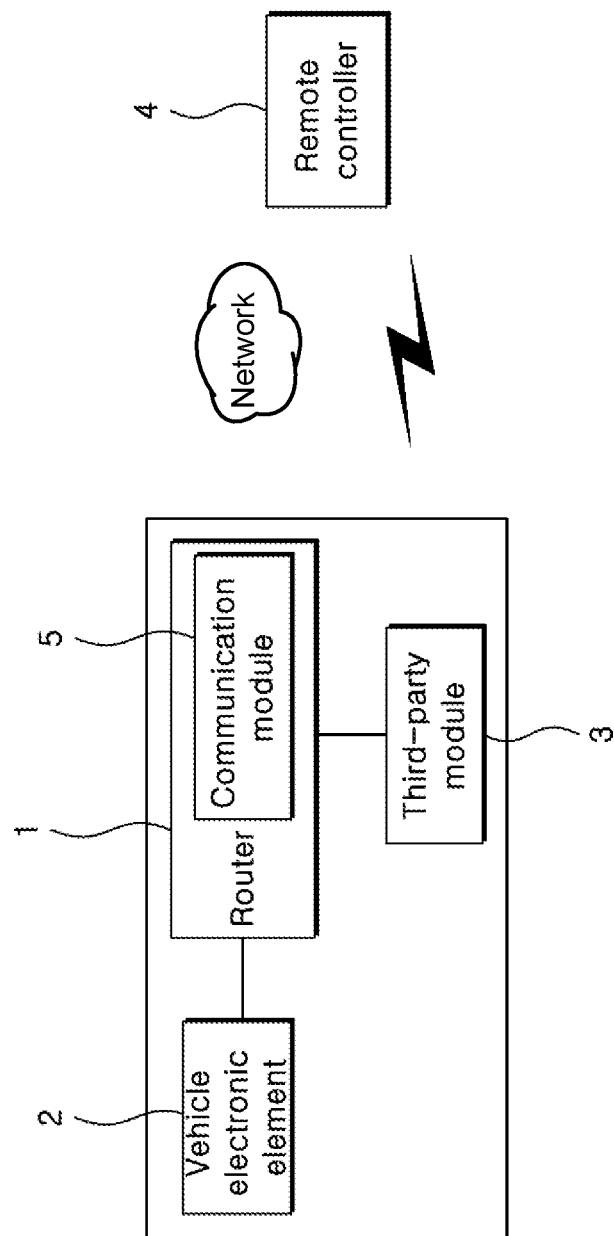
FIG. 1 is a conceptual view showing an Ethernet-based vehicle control system according to a first embodiment of the present invention.

1: Router
2: Vehicle electronic element
3: Third-party module
4: Remote controller
5, 6: Communication module

DETAILED DESCRIPTION OF THE PREFERRED EMBODIMENT

Hereinafter, the present invention will be described in detail with reference to preferred embodiments of the present invention and the accompanying drawings, and it will be described on the premise that the same reference numerals refer to the same components.

In the detailed description or claims of the present invention, when any one component "includes" another component, it is not construed as being limited to only the component unless otherwise stated, and it should be understood that the component may further include other components.

In addition, in the detailed description or claims of the present invention, the components named as "~ means", "~ unit", "~ module", or "~ block" refer to units that process at least one or more functions or operations, and each of these components may be implemented by software, hardware, or a combination of these.

Hereinafter, an example in which the Ethernet-based vehicle control system and method of the present invention is implemented will be described through a specific embodiment.

FIG. 1 is a view showing the configuration of an Ethernet-based vehicle control system according to a first embodiment of the present invention.

Referring to FIG. 1, an Ethernet-based vehicle control system of the present invention basically includes a router 1 for connecting a vehicle internal network and a vehicle external network based on Ethernet, and a vehicle electronic element 2 connected to and communicating with the router 1, and in the present invention, a third-party module 3 newly mounted on the vehicle to control the vehicle electronic element 2 is included.

Meanwhile, the router 1 may include a communication module 5 for communicating with a remote controller 4 through the vehicle external network. As the communication module 5, a short-range communication module including Wi-Fi, Bluetooth, ZigBee, short-range RF and the like and a mobile communication module including GSM/GPRS, UMTS/WEDGE/HSDPA, CDMA and the like may be selectively used.

In addition, the vehicle electronic element 2 is an electronic equipment part that is set in a genuine state for each trim level when the vehicle is manufactured, and includes an electronic control unit (ECU), controllers, sensors and the like for controlling the transmission, door locks and the like which basically constitute the vehicle.

For example, a remote keyless entry (RKE) module may be included as the vehicle electronic component 2, and a piggyback controller module may be included as the third-party module 3. That is, a separate piggyback controller module may be added to implement various functions using the RKE module in a vehicle equipped with the RKE module by default.

Of course, both the RKE module and the piggyback controller module may be included as the third-party module 3. That is, the RKE module and the piggyback controller module may be added together to implement the RKE function and various functions by utilizing the RKE function in a vehicle not equipped with the RKE module by default.

Figure 2:
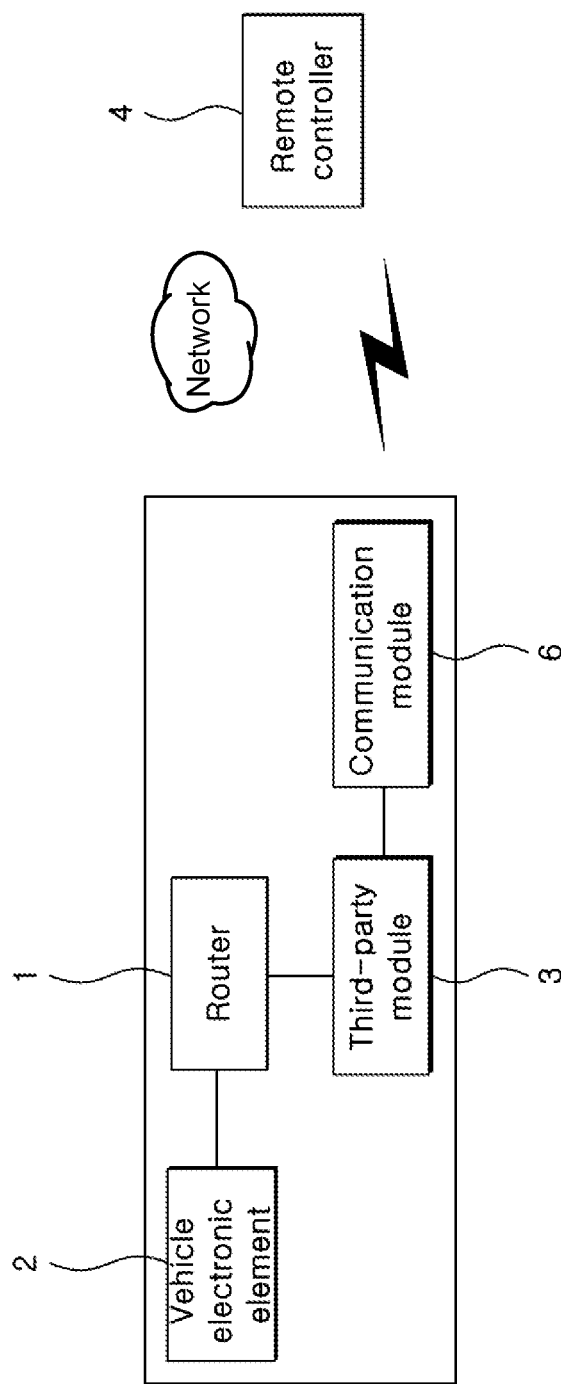
FIG. 2 is a conceptual view showing an Ethernet-based vehicle control system according to a second embodiment of the present invention.

FIG. 2 is a view showing the configuration of an Ethernet-based vehicle control system according to a second embodiment of the present invention.

Hereinafter, duplicate description of the same configuration and configurations performing the same function will be omitted in the description of drawings.

Referring to FIG. 2, compared with the Ethernet-based vehicle control system of FIG. 1, the difference is that a communication module 6 for third-party module, which communicates with the remote controller 4 through the vehicle external network, is connected to the third-party module 3. That is, compared with the first embodiment described above, the router 1 proposed in this embodiment may not include a communication module.

On the other hand, when the vehicle electronic element 2 includes an RKE module or the third-party module 3 includes both an RKE module and a piggyback controller module, it is preferable that the communication module 6 for third-party module is connected only to the RKE module.

Figure 3:
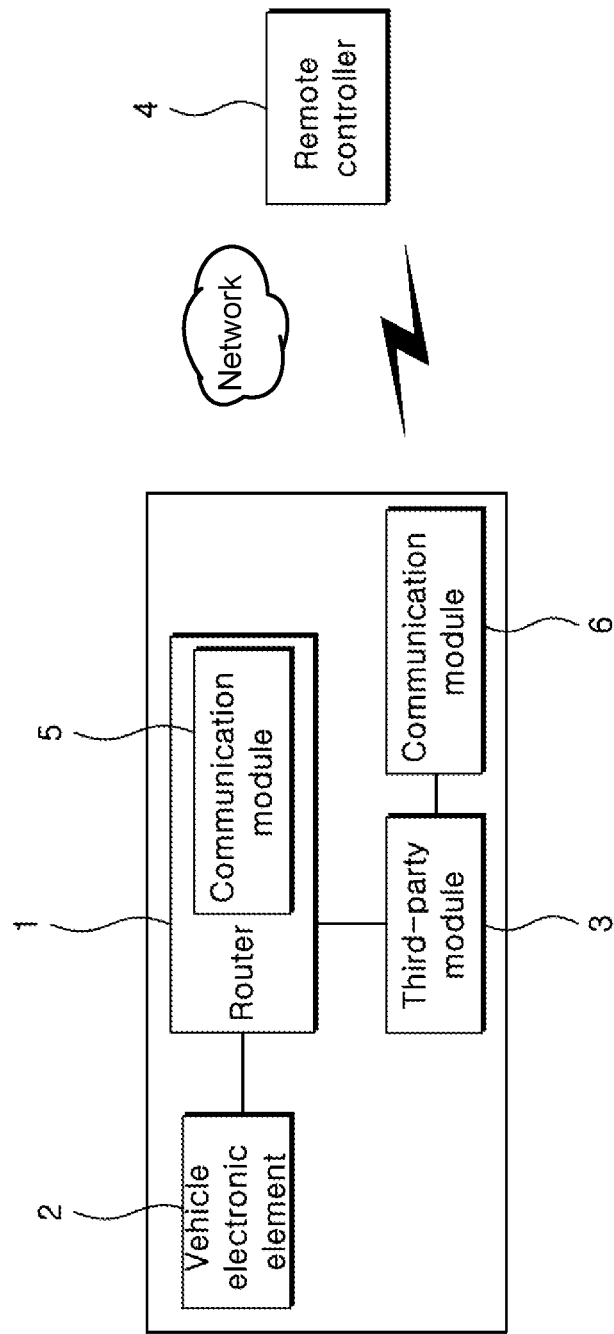
FIG. 3 is a conceptual view showing an Ethernet-based vehicle control system according to a third embodiment of the present invention.

FIG. 3 is a view showing the configuration of an Ethernet-based vehicle control system according to a third embodiment of the present invention.

Referring to FIG. 3, compared with the Ethernet-based vehicle control system of FIG. 1, a communication module 6 for third-party module, which communicates with the remote controller 4 through the vehicle external network, may be additionally connected to the third-party module 3.

For example, the communication module 5 included in the router 1 proposed in this embodiment may use a mobile communication network while the vehicle travels, and the communication module 6 for third-party module may use a local area network in a parking state. Of course, the method of using the communication module 5 included in the router 1 and the communication module 6 for third-party module may be randomly selected and controlled by the user.

On the other hand, when the vehicle electronic element 2 includes an RKE module or the third-party module 3 includes both an RKE module and a piggyback controller module, it is preferable that the communication module 6 for third-party module is connected only to the RKE module.

Meanwhile, although a case in which the vehicle electronic element 2 and the third-party module 3 proposed in the first to third embodiments are individually connected to the router 1 is described, the third-party module 3 may be formed between the vehicle electronic element 2 and the router 1. Through the configuration like this, the third-party module 3 may perform four functions described below.

Meanwhile, the third-party module 3 proposed in the first to third embodiments described above may perform four functions described below.

First, the third-party module 3 may convert a packet transmitted from the vehicle external network into a signal required by the vehicle electronic element 2 and transmit the signal to the vehicle electronic element 2 so that the vehicle electronic element 2 may perform a corresponding operation.

Second, the third-party module 3 may directly control the vehicle electronic element 2 in response to a packet transmitted from the vehicle external network.

Third, the third-party module 3 may bypass input and output packets to the vehicle electronic element 2 and the vehicle external network as they are.

Fourth, the third-party module 3 may ignore the packets output from the vehicle electronic element 2 and modulate and transmit corresponding packets to the vehicle electronic element 2 and the vehicle external network, or contrarily, the third-party module 3 may delete the packets input into the vehicle electronic element 2 and modulate and transmit corresponding packets to the vehicle electronic element 2.

As all the data transmitted and received between the vehicle electronic element 2 and the router 1 pass through the third-party module 3 in this way, the third-party module 3 may control the input and output signals. That is, the third-party module 3 may convert a packet to match a corresponding vehicle in response to a request signal, directly control a corresponding vehicle electronic element 2 by cloning the MAC address of the vehicle electronic element 2 in response to a request signal, bypass input and output signals, or override input and output signals.

Meanwhile, for example, in the first to third embodiments described above, an RKE module is already installed as the vehicle electronic element 2, and a piggyback controller may be mounted as the third-party module 3. That is, as a specific function is not included in the trim level of a vehicle, the piggyback controller may be installed to perform the specific function. In response to installation of the piggyback controller, the piggyback controller broadcasts a search message to the router 1. At this point, the search message includes the MAC address and information related to the specific function. Accordingly, the router 1 assigns an IP address in response to the received search message, and broadcasts an IP providing message to the piggyback controller. The IP providing message may include the MAC address, the assigned IP address, the router IP address, and the like. A process of registering the MAC address in the router 1 is performed in this way, and accordingly, the router 1 may perform routing corresponding to input and output signals based on a MAC address table in which the relation with previously registered MAC addresses is established.

Here, for example, a case where it is desired to perform remote start as a specific function of the piggyback controller is briefly described. Although it may vary according to the trim level of a vehicle, generally, a vehicle may start only when a vehicle remote control key is located inside the vehicle. However, when a piggyback controller is mounted, remote start should be allowed although the vehicle remote control key is not located inside the vehicle.

To this end, when a remote vehicle start signal is transmitted through a vehicle external network, the piggyback controller arbitrarily generates a virtual signal indicating that the vehicle remote control key is recognized inside the vehicle, a virtual signal indicating that the start button is pressed by the vehicle remote control key, and a virtual signal indicating that the transmission is at a specific position (e.g., Park), and informs the vehicle electronic element 2 of the virtual signals although the vehicle remote control key is not located inside the vehicle. Accordingly, start control by the vehicle electronic element 2 will be performed. That is, the piggyback module arbitrarily generates a signal indicating that the vehicle remote control key is recognized inside the vehicle and the start button is pressed by the vehicle remote control key, and inform the generated signal to the vehicle electronic element 2 related to remote start, in response to the remote vehicle start signal.

At this point, in the present invention, in order to enhance security, when the piggyback module transmits a packet (command signal) on the Ethernet, other vehicle electronic elements 2 of the vehicle internal network may confirm the MAC address and check whether a registered vehicle electronic element 2 has transmitted the packet. To this end, the piggyback module may use a method such as cloning the MAC address. Of course, the security may also be enhanced in other ways.

Hereinafter, a specific embodiment of the Ethernet-based vehicle control system of the present invention will be described, and in this embodiment, a case where the RKE module is installed by default and the piggyback controller is installed as a third-party module will be described. Of course, as described above, the RKE module may be newly installed, and for convenience of explanation, it is assumed that a remote signal is received by the RKE module.

Figure 4:
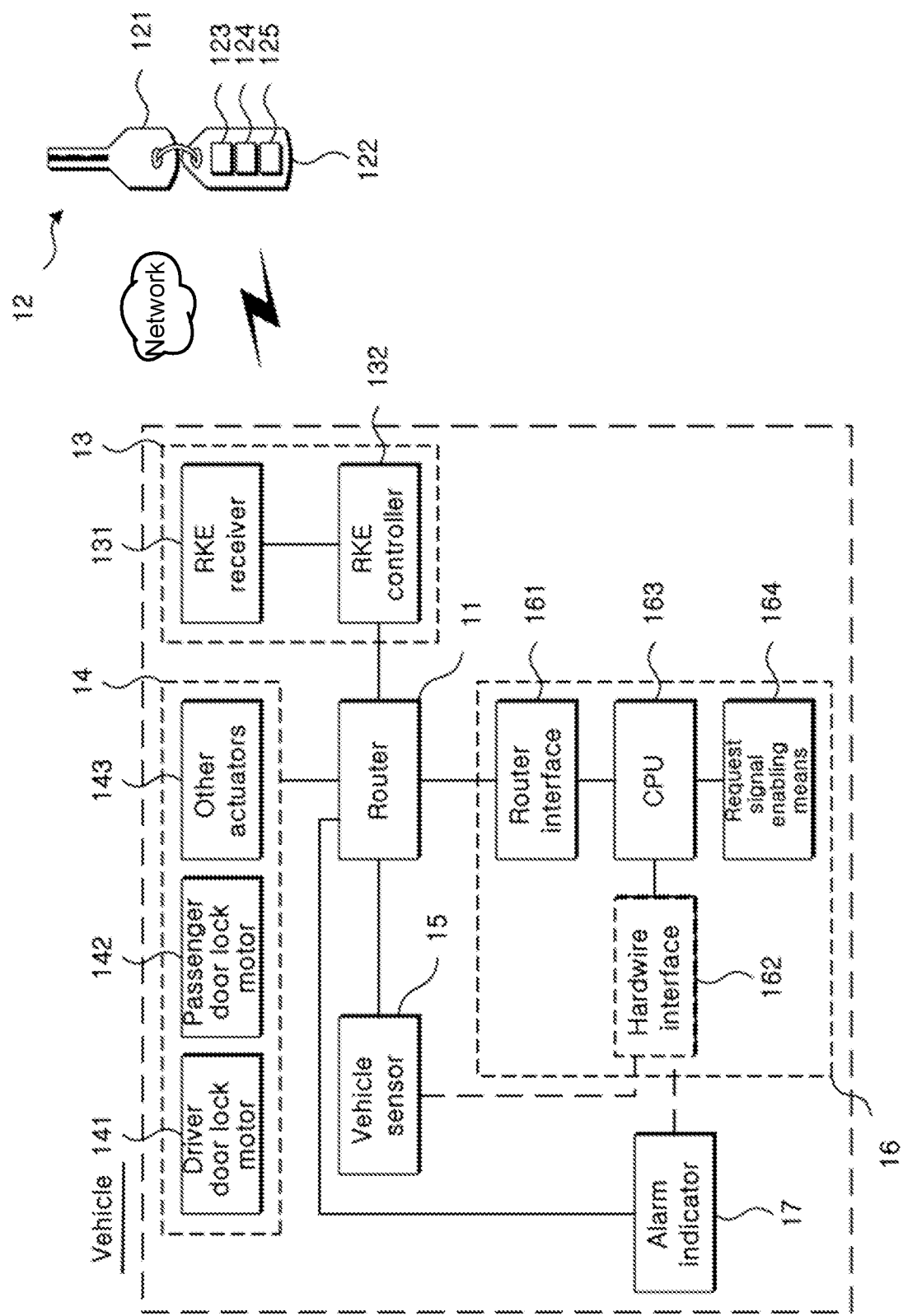
FIG. 4 is a block diagram showing a control circuit of a remote control device including an RKE system and a piggyback alarm controller as a first application example of the present invention.

FIG. 4 is a view showing the configuration of a remote control device as an application example of the present invention.

Referring to FIG. 4, the remote control device illustrated in the present invention operates based on the Ethernet, and thus a router 11 connecting a vehicle internal network and a vehicle external network is basically installed in the vehicle.

Accordingly, an RKE module 13 for receiving a signal transmitted from the RKE transmitter 12 and performing a control corresponding to the signal through short-range communication or mobile communication, an actuator group 14 for controlling vehicle electronic elements, a vehicle sensor 15 for sensing a vehicle state, a piggyback controller 16 for performing a specific function of a vehicle using a signal transmitted from the RKE transmitter 12, and an alarm indicator 17 for performing an alarm function may be connected to the router 11.

Here, the RKE transmitter 12 is carried by a user, and the RKE module 13 may include an RKE receiver 131 for receiving a signal transmitted from the RKE transmitter 12, and an RKE controller 132 for generating an RKE signal from the signal transferred from the RKE receiver 131.

Meanwhile, the actuator group 14 may include a driver door lock motor 141, a passenger door lock motor 142, and other actuators (trunk, horn, light, etc.) 143.

The RKE transmitter 12 includes a housing 122 in which a plurality of user push buttons or switches are formed, as well as a vehicle ignition key 121. For example, a door lock button 123, a door unlock button 124, a trunk release button 125 and the like are formed in the housing 122. Although not shown, a panic button may be provided on the opposite side so that the vehicle may sound the horn. In addition, the RKE transmitter 12 may include a replaceable battery and related electronic devices for transmitting radio signals from the vehicle to the RKE receiver 131. Generally, when the door unlock button 124 is pressed once, only the driver door lock is opened, and when the door unlock button 124 is pressed twice within a predetermined time, the driver door lock is unlocked first, and subsequently, the side and/or rear door locks may be unlocked.

Here, preferably, the RKE receiver 131 may be a change code type. The change code means that the RKE transmitter 12 transmits, for example, a signal including a series of modulated bits on a radio frequency carrier. These bits generally include a fixed code part and a change code part. The change code part provides additional security to the remote control device to prevent an arbitrary RKE transmitter 12 (unauthorized transmitter) from activating the RKE controller 132. Particularly, the term change code generally means to include a considerably short repeated code such as a rolling code. Such a rolling code may be repeated, for example, every eight transmissions. In addition, the change code is intended to include a pseudo-random code that can be repeated only after thousands or millions of operations. The RKE transmitter 12 and the RKE receiver 131, each of which internally generates or stores a change code pattern, are synchronized together.

The driver door lock (lock and unlock) motor 141 is connected to the router 11 together with the passenger door lock (lock and unlock) motor 142 that operates the rear doors of the vehicle. The driver and passenger door lock motors 141 and 142 may be connected to the router 11 and include their own transceivers. Selectively, the driver and passenger door lock motors 141 and 142 may be connected to the router 11 with intervention of a common or shared interface module not shown in the figure. The driver and passenger door lock motors 141 and 142 provide an RKE actuator. The RKE controller 132 may also monitor the router 11 for other signals to confirm whether a door lock (locking or unlocking) signal should be generated. For example, the RKE controller 132 may check whether the ignition key 121 is in an ignited state. In addition, the RKE controller 132 may operate other actuators 143 either directly or through a separate interface for trunk separation or vehicle horn operation and/or various interior or exterior vehicle lights.

For example, the present invention adds the piggyback controller 16 to the vehicle to perform a requested function based on a predetermined RKE signal generated in the router 11 by the RKE controller 132. Accordingly, the piggyback controller 16 may simply add one or more new remote control functions to a vehicle including the RKE system and the router 11.

For example, as shown in FIG. 4, the remote control device also includes at least one vehicle security sensor 15 connected to a piggyback alarm controller 16. This connection may be a wired connection through a hardwire input/output (I/O) interface 162 or through the router 11. Of course, in a typical embodiment, impact or proximity sensors may be monitored in addition to a plurality of sensor inputs such as door, hood and trunk switches. The piggyback alarm controller 16 may receive these signals through the router 11, a hardwire connection, or a combination of these two.

Similarly, the alarm indicator 17, which may be provided by an alarm, may be connected to the hardwire I/O interface 162 through the router 11 or directly. The alarm indicator 17 may be a vehicle horn in another embodiment. In still other embodiments, the alarm indicator 17 may be, for example, a wireless transmitter for transmitting signals to a receiver carried by a user or monitored at a central station.

The piggyback alarm controller 16 includes a central processing unit (CPU) 163 connected to a router interface 161 and the hardwire I/O interface 162. As shown in FIG. 4, a request signal enabling means 164 is connected to the CPU 163. The request signal enabling means 164 will be described below in more detail. The CPU 163 performs various logic control functions as described in this specification.

In the illustrated remote control device, the piggyback controller 16 is the piggyback alarm controller 16. Accordingly, a requested function performed by the piggyback alarm controller 16 is to switch between an arming mode capable of generating an alarm and a disarming mode, based on at least one vehicle security sensor 15.

Of course, a preset RKE signal may include door lock and door unlock signals. Particularly, a driver door unlock signal may be used to switch to a disarming mode. In other words, the piggyback alarm controller 16 may switch to the disarming mode whenever the RKE controller 132 outputs a door unlock signal to the router 11, and it is a signal for unlocking only the driver door. Optionally, the piggyback alarm controller 16 may need to confirm turn-off of the ignition switch. In order to switch to the arming mode, the piggyback alarm controller 16 may need to confirm both an ignition switch off command and a door lock command in the router 11.

In addition, the piggyback alarm controller 16 may have a manual arming feature for releasing the manual arming function and a valet mode. A passive arm may switch, for example, the piggyback alarm controller 16 to the arming mode at a preset time after the ignition key 121 is removed and the last vehicle door is closed. In the valet mode, this function may be turned off so that another people may use the vehicle. Accordingly, activation of an RKE door lock command, which occurs a preset number of times within a specific time and while the ignition switch turned on, may enter the valet mode. Those skilled in the art will understand that a predetermined RKE signal may include at least one or a pattern of a door lock signal, a door unlock signal, a trunk release signal, a light control signal, and a horn control signal. In addition, these signals may be used to release from a trigger mode or to switch to an active mode. At this point, it is preferable that a preset signal does not collide with other functions performed in the vehicle.

Figure 5:
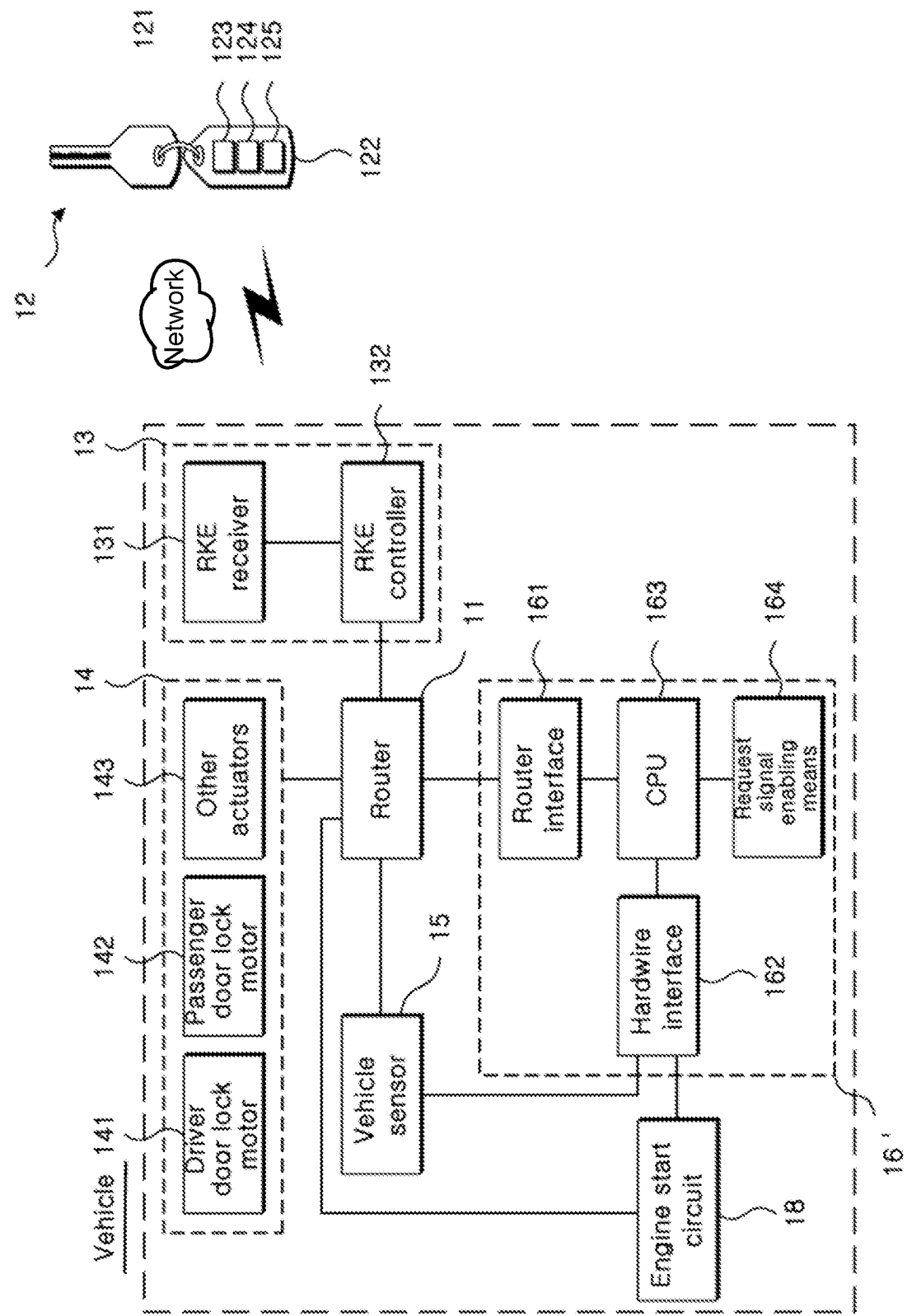
FIG. 5 is a block diagram showing a control circuit of a remote control device including an RKE system and a piggyback remote start controller as a second application example of the present invention.

On the other hand, the remote control device shown in FIG. 5 is used as, for example, a piggyback remote start controller 16', and includes a remote start function that can be piggybacked on an existing RKE system. The remote control device includes a schematically shown engine start circuit 18 connected to the piggyback remote start controller 16', and a requested function is to operate the engine start circuit. In addition, at least one vehicle sensor 15 may be used in this embodiment to guarantee a suitable vehicle.

Here, the engine start circuit 18 is shown in a simplified form. However, engine start generally includes bypassing one or more immobilization circuits, cranking an engine starter, and monitoring various vehicle parameters. The monitored vehicle parameters may include brake pedal pressure, engine RPM, gear selector position, and the like.

Connection to the vehicle sensor 15 and the engine start circuit 18 may be made through the router 11 or hardwire connection. In addition, a combination of hardwire and router 11 connection may be used.

Start of the engine may be made by pressing the door unlock button 124 of the RKE transmitter 12 several times within a predetermined time window. Contrarily, ending the engine operation may occur by repeatedly pressing the door lock button 123.

As another example of the present invention, it may be configured to operate the piggyback alarm controller 16 or the piggyback remote start controller 16' together with a specific vehicle when the vehicle uses different RKE signals. The piggyback controllers 16 and 16' may include a request signal enabling means 164 that allows execution of a requested function based on a predetermined RKE signal for a corresponding requested vehicle from a plurality of RKE signal sets for different vehicles.

A first embodiment of the request signal enabling means 164 will be described with reference to FIG. 6. Although the request signal enabling means 164 is described to be used together with the piggyback alarm controller 16 for simplicity of explanation, it is natural that it is also applied to the piggyback remote start controller 16'. The request signal enabling means 164 allows the piggyback alarm controller 16 to operate using a request signal set for a requested vehicle among a plurality of available signal sets for different vehicles. Here, the term different vehicles may include vehicles manufactured by different manufacturers, different models, or even different trim levels of the same make and model. Therefore, the request signal enabling means 164 allows communication with the vehicle security sensor 15 and the alarm indicator 17 through the piggyback alarm controller 16, i.e., the router 11, so that the piggyback alarm controller 16 may operate the alarm indicator 17 in response to the vehicle security sensor 15.

Figure 6:
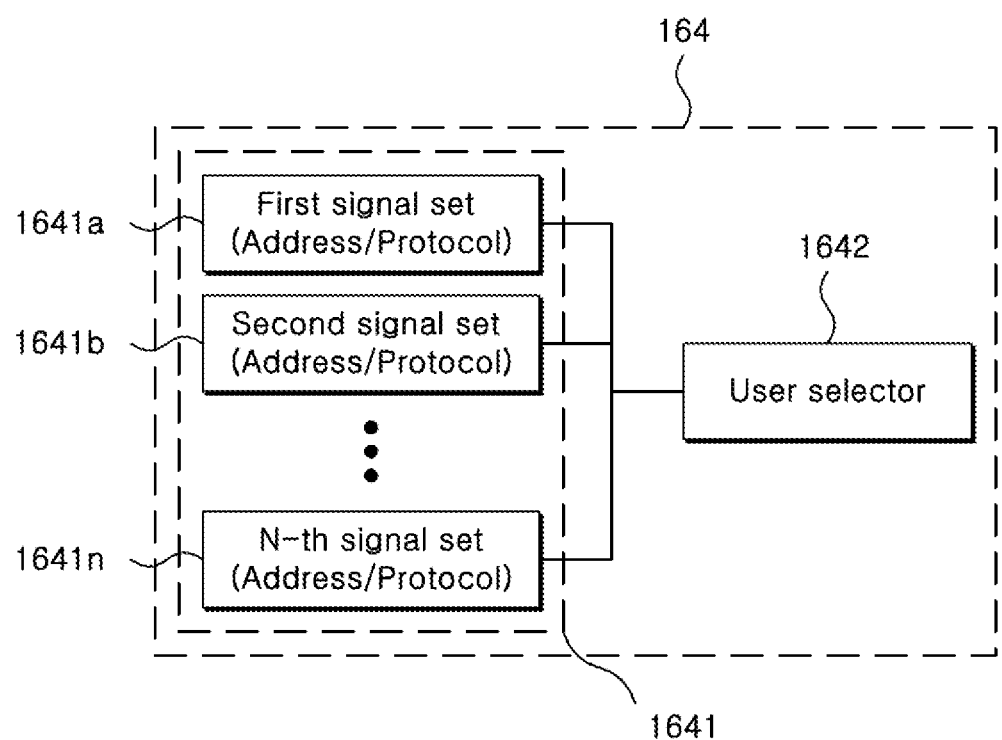
FIG. 6 is a view showing an example of a request signal enabling part of a remote start control device applied to the present invention.

As shown in FIG. 6, the request signal enabling means 164 may preferably include a memory 1641 for storing signals of a plurality of sets 1641*a*, 1641*b* and 1641*n* for different vehicles, and a selection means for selecting a request signal set from signals of a plurality of different sets for different vehicles. Storing a signal set means storing information or data needed for generating a request signal by the router 11. The memory 1641 may include a device address memory for storing a plurality of different signal sets representing different device addresses for different vehicles. Optionally or additionally, the memory may include a protocol memory for storing a plurality of different protocols for different vehicles. The selection means may include a user selector 1642 that allows a user to select a request signal set. The user may select a request signal set for the vehicle using a keypad or other input devices. For example, a valet switch may be handled to allow the user to select a request signal set. The user may select a request signal set by entering a unique digital code similar to signal selection for universal remote control of home appliances. Other techniques that allow a user to select a request signal set from a plurality of stored sets are also considered by the present invention.

Figure 7:
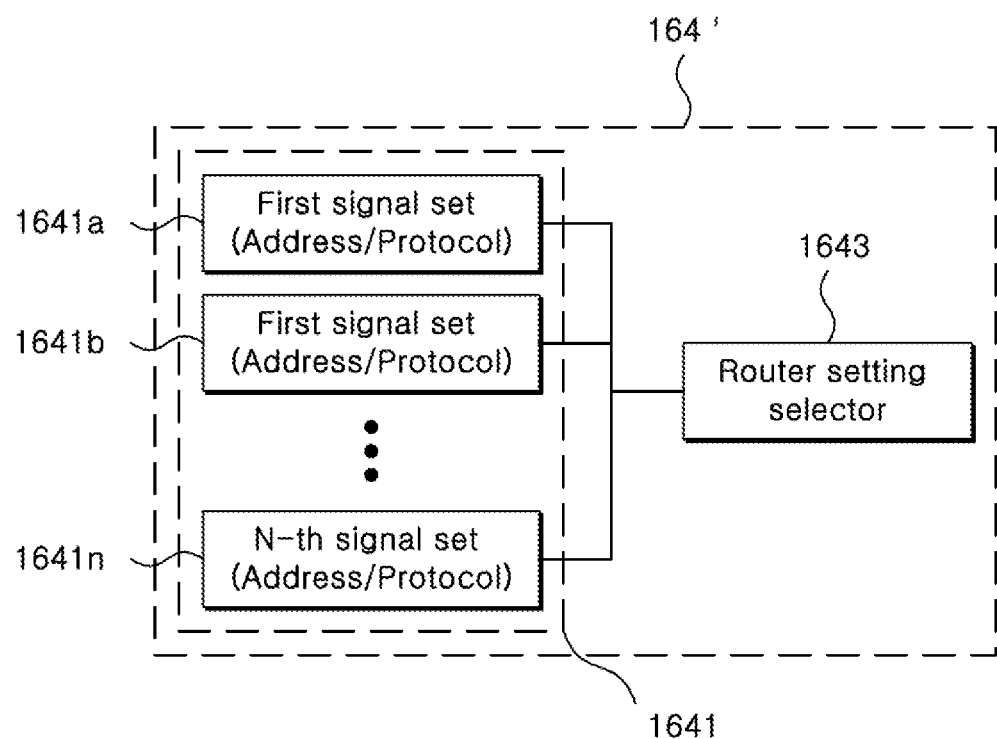
FIG. 7 is a view showing another example of a request signal enabling part of a remote start control device applied to the present invention.

Referring to FIG. 7, another embodiment of the request signal enabling means 164' will be described according to the present invention. In this embodiment, the selection means may include a router setting selector 1643 for setting a request signal set based on a signal from the router 11. For example, the router setting selector 1643 may set a request signal set based on a sensed voltage level or timing of the signal pulse of the router 11. Since other components of the request signal enabling means 164' according to the present embodiment are similar to those described above with reference to FIG. 6, no further description is required.

Figure 8:
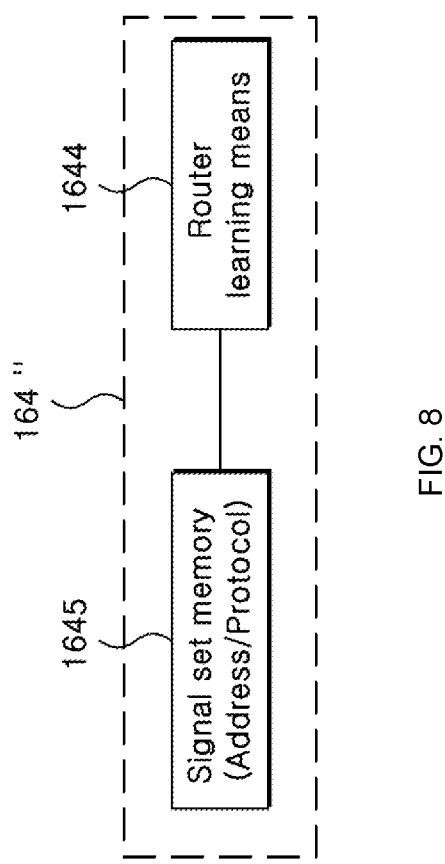
FIG. 8 is a view showing still another example of a request signal enabling part of a remote start control device applied to the present invention.

As shown in FIG. 8, in another embodiment of the request signal enabling means 164", the request signal enabling means 164" includes a request signal set memory 1645 operably connected to a router learning circuit or means 1644 shown in the figure. For example, the router learning circuit or means 1644 may allow a user to operate various vehicle devices and store request signal sets based thereon. Since other components of the request signal enabling means 164" are similar to those described in FIG. 6, further description thereof will be omitted.

Figure 9:
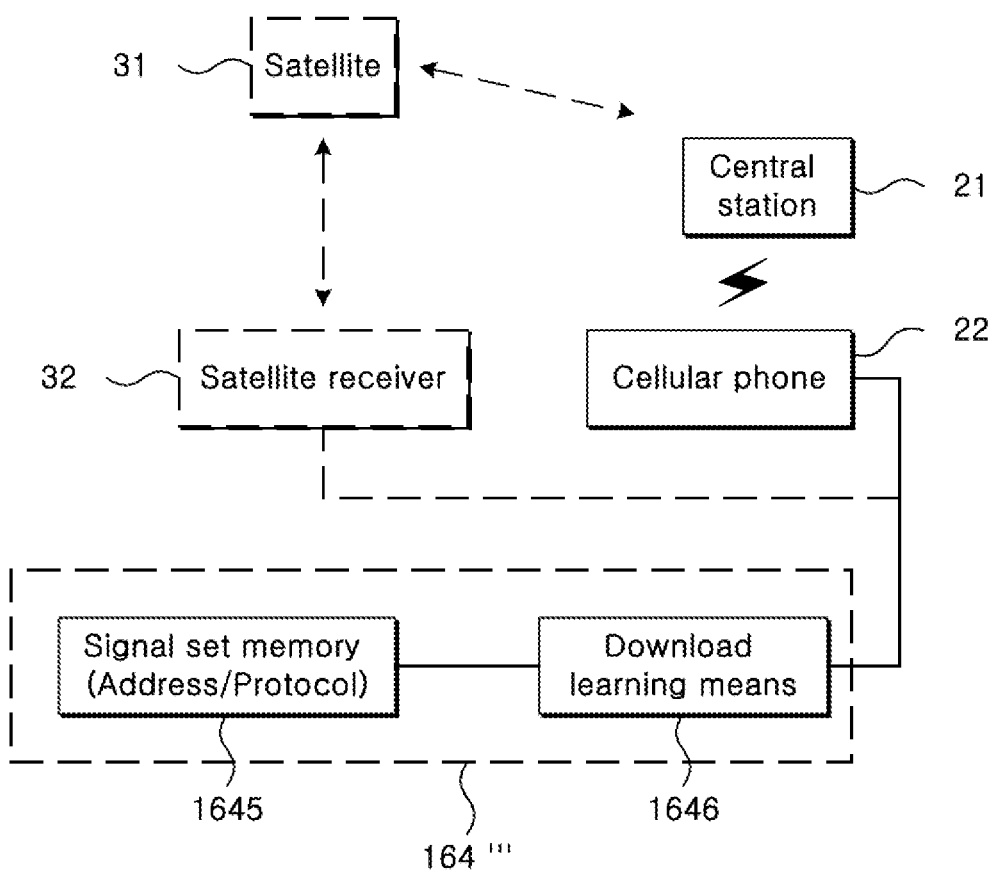
FIG. 9 is a view showing still another example of a request signal enabling part of a remote start control device applied to the present invention.

Still another embodiment of the request signal enabling means 164''' will be described with reference to FIG. 9. The request signal enabling means 164''' includes a signal set memory 1645 operably connected to a download learning means 1646 schematically shown in the figure. For example, it includes an interface connected to the illustrated vehicle cellular phone 22 to allow learning or download of a request signal set from a remote or central monitoring and control station 21. The request signal set may also be alternately trained from the remote or central monitoring and control station 21 through a satellite link provided by a satellite 31, a vehicle-mounted satellite receiver 32, and related antennas. The download learning means 1646 and other request signal enabling means may be implemented by software in the CPU of the piggyback remote start controller 16' or a separate microprocessor or circuit.

Figure 10:
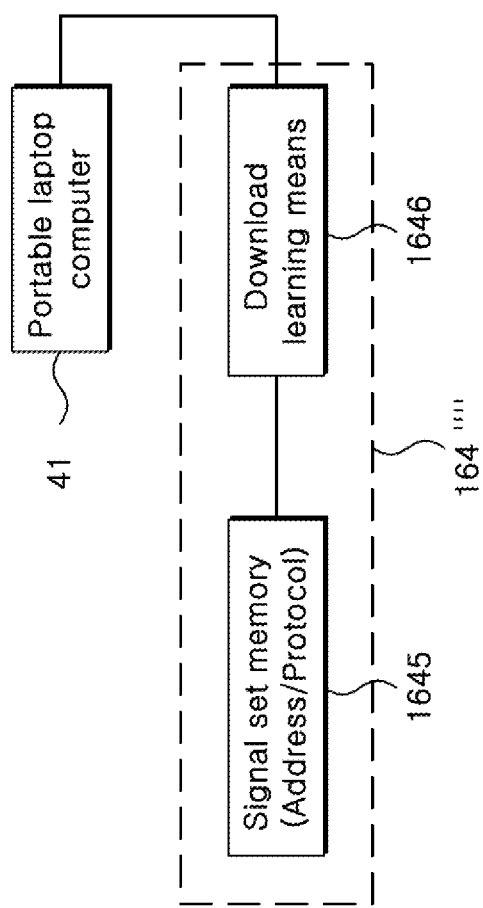
FIG. 10 is a view showing still another example of a request signal enabling part of a remote start control device applied to the present invention.

Referring to FIG. 10, still another variation of programming, learning or downloading of the download learning means 1646 is described. In this variation, the download learning means 1646 is temporarily connected to a computer such as the portable laptop computer 41 shown in the figure.

The connection may be made through a wired or wireless communication link. Of course, in this embodiment, the request signal enabling means 164'''' may be programmed in the vehicle or before being installed in the vehicle. The portable laptop computer 41 may, for example, receive a request signal set from an Internet web site.

Returning to and referring to FIGS. 4 and 5 again, the method of the present invention is for piggybacking a requested function on the RKE system in a vehicle of a type including the router 11 as described above. The RKE system includes the RKE transmitter 12 carried by the user, the RKE receiver 131, and the RKE controller 132 connected to the RKE receiver 131 to generate an RKE signal in the router 11 in response to an RKE signal. This method preferably includes the steps of connecting the piggyback controllers 16 and 16' to the router 11; and piggybacking a requested function on the RKE system by performing the requested function on the basis of a preset RKE signal generated in the router 11 by the RKE controller 132 using the piggyback controllers 16 and 16'.

The vehicle may further include at least one vehicle security sensor 15, and the piggyback controller 16 includes a piggyback alarm controller 16 connected to the at least one vehicle security sensor 15. Accordingly, in this embodiment, the requested function is to switch the piggyback alarm controller 16 to an arming mode capable of generating an alarm through the alarm indicator 17 and to a disarming mode, based on at least one vehicle security sensor. In addition, in the embodiment shown in FIG. 5, the vehicle includes an engine start circuit 18. The piggyback controller 16 includes a piggyback remote start controller 16' connected to the engine start circuit. The requested function is to activate the engine start circuit 18.

As described above, according to the Ethernet-based vehicle control system and method of present invention, since a third-party module can be freely installed and replaced based on Ethernet, various services related to a vehicle may be realized through a vehicle external network.

The technical spirit of the present invention has been described above through several embodiments.

It is apparent that those skilled in the art may diversely modify or change the embodiments described above from the description of the present invention. In addition, although it is not explicitly shown or described, it is apparent that those skilled in the art may make modifications of various forms including the technical spirit of the present invention from the description of the present invention, and this still belongs to the scope of the present invention. The embodiments described above with reference to the accompanying drawings are described for the purpose of describing the present invention, and the scope of the present invention is not limited to these embodiments.

What is claimed is:

1. An Ethernet-based vehicle control system, comprising:
    a router for connecting a vehicle internal network and a vehicle external network;
    vehicle electronic elements connected to and communicating with the router; and
    a third-party module connected to the router such that all the data transmitted and received between the vehicle electronic elements and the router pass through the third-party module;
    wherein,
        the vehicle electronic elements include a Remote Keyless Entry (RKE) module; and
        the third-party module piggybacks on a signal input into the RKE module through the vehicle external network by:
            cloning a MAC address of a first vehicle electronic element of the vehicle electronic elements;
            generating a virtual signal corresponding to the signal input into the RKE module; and
            transmitting the virtual signal to a second vehicle electronic element of the vehicle electronic elements.

2. The system according to claim 1, wherein the RKE module includes:
    an RKE receiver for receiving a signal transmitted from an RKE transmitter; and
    an RKE controller for generating an RKE signal from a signal transferred from the RKE receiver.

3. The system according to claim 2, further comprising a piggyback controller for performing a requested piggyback control function based on a preset RKE signal generated by the RKE controller, wherein the vehicle electronic elements include at least one vehicle sensor, and at least one RKE actuator for performing an RKE function in response to the RKE signal.

4. The system according to claim 3, further comprising the at least one vehicle sensor connected to the piggyback controller, wherein the piggyback controller performs the requested piggyback control function based on the at least one vehicle sensor.

5. The system according to claim 4, wherein the at least one vehicle sensor includes at least one vehicle security sensor, and the piggyback controller includes a piggyback alarm controller connected to the at least one vehicle security sensor, and the requested piggyback control function is switching the piggyback alarm controller between an arming mode capable of generating an alarm and a disarming mode, based on the at least one vehicle security sensor.

6. The system according to claim 2, wherein the vehicle electronic elements include at least one vehicle security sensor of the vehicle, and a piggyback alarm controller for switching between an arming mode and a disarming mode based on preset RKE signals generated by the RKE controller, wherein an alarm is generated based on the at least one vehicle security sensor when the piggyback alarm controller is in the armed mode.

7. The system according to claim 2, further comprising a piggyback remote start controller for activating an engine start circuit based on a predetermined RKE signal generated by the RKE controller and at least one vehicle sensor, wherein a vehicle includes the engine start circuit, and the vehicle electronic elements include the at least one vehicle sensor.

* * * * *